United States Patent
Saitoh

(10) Patent No.: US 6,493,831 B1
(45) Date of Patent: Dec. 10, 2002

(54) TIMER CIRCUITS FOR A MICROCOMPUTER

(75) Inventor: Hiroshi Saitoh, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/414,035

(22) Filed: Oct. 7, 1999

(30) Foreign Application Priority Data

Oct. 9, 1998 (JP) .......................................... 10-287826

(51) Int. Cl.[7] ................................................ G06F 1/04
(52) U.S. Cl. ..................................................... 713/502
(58) Field of Search .............................. 713/500, 501, 713/502, 600, 601

(56) References Cited

U.S. PATENT DOCUMENTS

| | | | | |
|---|---|---|---|---|
| 5,657,361 A | * | 8/1997 | Inagaki et al. | 377/39 |
| 5,812,833 A | * | 9/1998 | Goler et al. | 713/502 |
| 5,844,435 A | * | 12/1998 | Grundvig | 327/151 |
| 5,915,108 A | * | 6/1999 | Frey et al. | 713/500 |

* cited by examiner

Primary Examiner—Dennis M. Butler
(74) Attorney, Agent, or Firm—Rabin & Berdo

(57) ABSTRACT

A select circuit selectively outputs one of a transition indication signal that is the output of an edge sense circuit of an input timer, a transition indication signal that is an output of an edge sense circuit of an output timer, and a control signal for controlling output using software. The state of activation of a switch circuit for controlling transmission of a clock signal to a counter of the output timer is then controlled by the signal selected by the select circuit.

13 Claims, 3 Drawing Sheets

TIMER CIRCUITS FOR A MICROCOMPUTER

BACKGROUND OF THE INVENTION

1. Field of the Invention

The present invention relates to a microcomputer comprising of a semiconductor integrated circuit and more particularly relates to controlling the operation of a timer provided in a microcomputer.

2. Description of the Related Art

Microcomputers have input ports, output ports, memory and Central Processing Units (hereinafter referred to as "CPU's") and are operated under software control to perform various functions. Microcomputers therefore have a wide range of applications in control of the operation of household appliances and control of vehicle engines, etc.

Microcomputers are also provided with timers for controlling the timing of the operation of various functions. Timer circuits provided in microcomputers are, for example, input timers and output timers.

An input timer has a function for counting the number of pulses of a clock signal using a counter. An input timer transfers a number of pulses counted at a counter for outputting in response to the detection of a transition (for example, a falling edge from a level of a power supply voltage VDD to the level of an earth voltage VSS) of the voltage level of a pulse signal externally inputted via an input port, i.e. transferring of a count value for a number of pulses transferred in intervals occurring on transitions in the voltage level of the pulse signal inputted from one of the input ports can be carried out. The intervals between the occurrence of an external input signal can therefore be confirmed from the output of the register that is the output of the input timer.

Input timers are also used, for example, in microcomputers for use with vehicles in order to obtain the speed of a piston operation occurring in a cylinder of an ignition chamber used in an engine unit, i.e. a signal outputted in accompaniment with one piston operation is used as a pulse signal inputted from one of the input ports and the speed of the piston operation can be obtained by carrying out arithmetic processing using a count value stored in the register of the input timer.

Output timers have a function for counting the number of pulses of a clock signal using a counter. An output timer then outputs a signal indicating coincidence when the number of pulses counted by the timer coincides with a prescribed set pulse number.

In, for example, microcomputers for use with vehicles, an output timer is used in order to designate control of the timing of ignitions of a spark plug in a combustion chamber used in an engine unit, i.e. a signal indicating coincidence from an output timer is utilized in order to time ignitions of a spark plug in response to the prescribed set number of pulses in an effective manner.

When both the input timer and the output timer are used to control an engine unit in the above way, it is preferable to link mutual operations in order to make controlling the respective operations straightforward.

However, applications where each timer can be put to use are by no means limited to the above. Various demands are therefore made by the users, such as control of the operations in such a manner that the two timers are linked, control of the respective timer operations using software, and control of the respective timer operations using signals from outside of the microcomputer.

For example, when two external input signals for controlling the respective operations of the input timer and the output timer are prepared at peripheral circuits of a microcomputer, demands are made to control the operation of the respective timers using the two external input signals. Further, when a program for controlling the operation of the two timers is built into programmable memory within the microcomputer, control of the operation of the respective timers using software is demanded.

It is therefore an object of the present invention to provide a microcomputer capable of arbitrarily selecting methods of controlling operation of the timer functions and that can be put to a wide range of practical uses.

It is a further object of the present invention to achieve the aforementioned object without bringing about increases in circuit scale of increasing the complexity of control.

SUMMARY OF THE INVENTION

In order to realize the above object, the microcomputer of the present invention comprises a first timer circuit for outputting a count value counted for a number of clocks for a clock signal based on a transition indication signal indicating a transition of a voltage level of an externally inputted pulse signal, a second timer circuit operating in response to a count permit signal and outputting an output signal when the count value counted for the number of clocks of the clock signal becomes a prescribed count value and a select circuit for outputting one of a plurality of signals including the transition indication signal and an internally generated signal as a count permit signal for controlling the operation of counting the number of clocks of the clock signal.

In the microcomputer of the present invention, generation of the internally generated signal can be controlled by software.

The select circuit of the microcomputer of the present invention can output one of the plurality of signals as the count permit signal in response to the select indication signal.

Further, in the microcomputer of the present invention, the plurality of signals can include an externally inputted signal different from the pulse signal.

Still further, in the microcomputer of the present invention, the first timer circuit can comprise a dividing circuit for outputting a divided signal divided from the transition indication signal, and outputs the count value in response to the divided signal, with the divided signal being included in the plurality of signals selected by the select circuit.

DETAILED DESCRIPTION OF THE PREFERRED EMBODIMENTS

Figure 1:
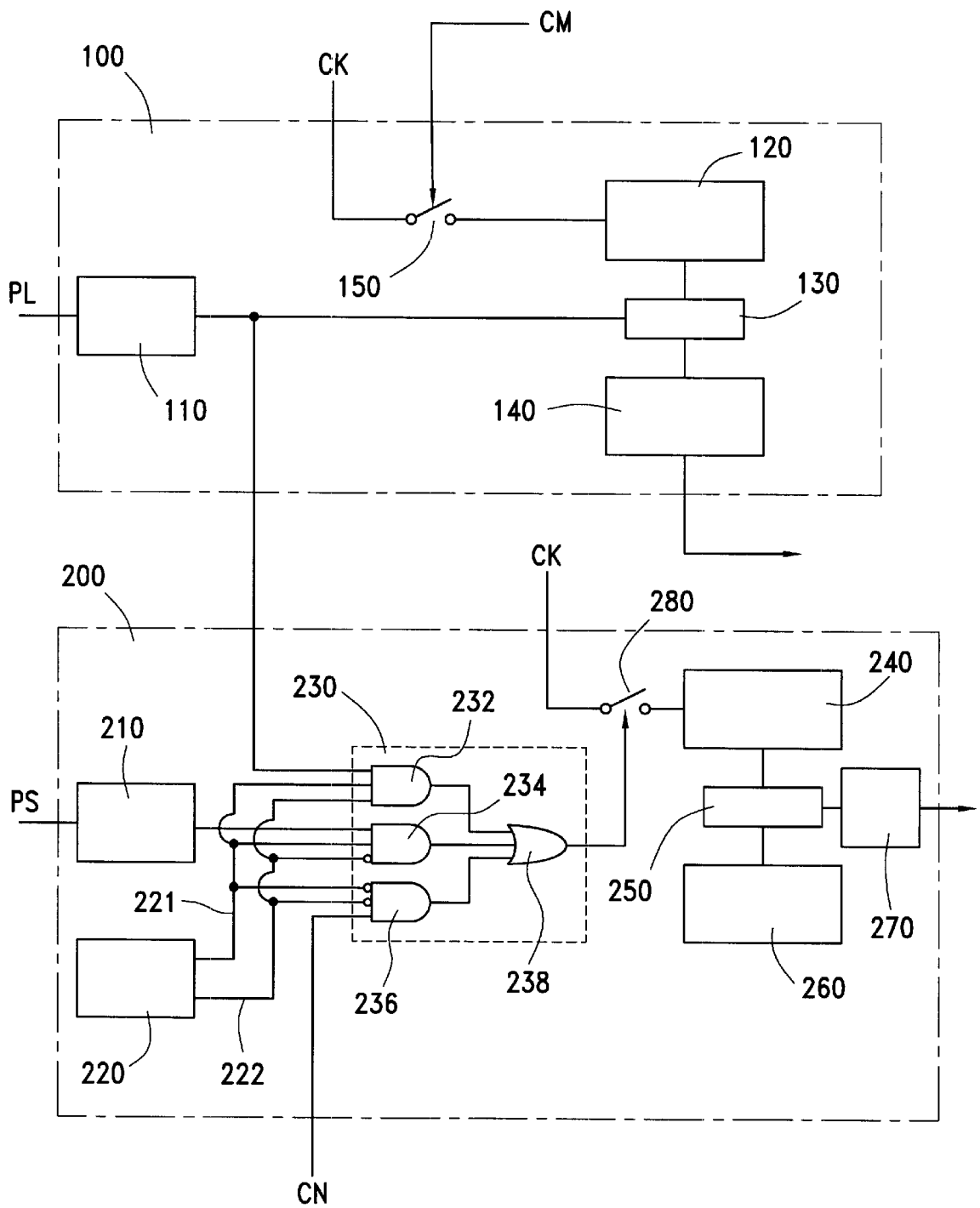
FIG. 1 is a block diagram of a timer circuit provided at a microcomputer of a first embodiment of the present invention.

The following is a detailed description using the drawings of a microcomputer of the present invention. FIG. 1 is a block diagram of a timer circuit built-into a microcomputer of a first embodiment of the present invention.

In FIG. 1, numeral 100 indicates an input timer that is a first timer circuit and numeral 200 is an output timer that is a second timer circuit.

The input timer 100 comprises an edge sense circuit 110, a counter 120, a gate circuit 130, a register 140 and a switch circuit 150.

The edge sense circuit 110 senses transitions in the voltage level of a pulse signal PL inputted as an external input signal via one input port (for example, a fall from a power supply voltage level VDD to the level of the earth voltage VSS) and outputs a transition indication signal indicating this transition. The power supply voltage level VDD is hereinafter referred to as an "H level" and the earth voltage level VSS is hereinafter referred to as an "L level". The transition indication signal is, for example, outputted as a one-shot pulse that temporarily becomes an H level when a fall in the pulse signal PL is sensed.

When the switch circuit 150 is activated, the counter 120 counts the number of clocks of the clock signal CK transferred via the switch circuit 150 and outputs the count value counted. If, for example, the counter 120 is an eight bit counter, a count value from 0 to 255 is outputted and a count value of 0 is returned to upon overflow (when the count value corresponds to 256). When the switch circuit 150 is not activated, the clock signal CK is not transmitted by the counter 120 and the count operation of the counter 120 is inhibited.

The active state of the switch circuit 150 is controlled by a control signal CM. The control signal CM is a signal for controlling output using software. For example, the switch circuit 150 is on when the voltage level of the control signal CM is an H level and is off when the voltage level of the control signal CM is an L level.

The gate circuit 130 transfers the count value outputted by the counter 120 to the register 140 when the voltage level of the transition indication signal that is the output of the edge sense circuit 110 is an H level. It is therefore necessary for the time for which the voltage level of the transition indication signal is a H level to be at least the time necessary for the register 140 to store the count value of the counter 120.

The register 140 stores and outputs the count value transferred via the gate circuit 130 on, for example, the rising edge of the clock signal CK.

The input timer 100 stores the count value of the counter 120 in the register 140 on the falling edge of the pulse signal PL. The count value stored in the register 140 that becomes the output of the input timer 100 is transferred to other peripheral circuits provided at the microcomputer.

For example, the count value stored in the register 140 can be transferred to a computing circuit so that fluctuations in the count value can be detected by subtraction from a previously transferred count value.

If this input timer 100 is provided at a microcomputer for use in a vehicle so that the pulse signal PL generates one pulse in response to one piston operation of a cylinder for an engine unit, this process can detect whether or not the speed of the piston operation of the cylinder of the engine unit is accelerating or decelerating. The counting operation of the counter 120 being inhibited, i.e. the switch circuit 150 being off is then for when, for example, the piston operation of the cylinder of the engine unit is stopped.

The output timer 200 comprises an edge sense circuit 210, a register 220, a select circuit 230, a counter 240, a coincidence detection circuit 250, a register 260 and an output circuit 270.

The edge sense circuit 210 senses transitions in the voltage level of a pulse signal PS inputted as an external input signal via one input port (for example, a fall from an H level to an L level) and outputs a transition indication signal indicating this transition. This transition indication signal is outputted as a one-shot pulse that temporarily becomes an H level when a falling edge of the pulse signal PS is detected.

The register 220 stores information indicating which of a plurality of signals inputted to the select circuit 230, to be described later, is selected and outputs signals to wiring 221 and 222 in response to this information. The information stored and the select circuit 230 will now be described. In this embodiment, the register 220 comprises, for example, two flip-flops for storing a two-bit portion of information.

A transition indication signal that is the output of the edge sense circuit 110, a transition indication signal that is the output of the edge sense circuit 210, the control signal CN, and signals outputted at the wiring 221 and 222 that are the output of the register 220 are inputted to the select circuit 230. The control signal CN is a signal for controlling output using the software.

The select circuit 230 comprises three three input/one output AND gates 232, 234 and 236, and one three input/one output OR gate 238.

The transition indication signal that is the output of the edge sense circuit 110 and the signals transferred via the wiring 221 and 222 are inputted to the AND gate 232. A signal is therefore outputted as an output signal of the AND gate 232 in response to the transition indication signal that is the output of the edge sense circuit 110 when the voltage levels of the signals transferred via the wiring 221 and 222 are both H levels. When the voltage levels of the signals transferred by the wiring 221 and 222 are not both H levels, an L voltage level signal is outputted as the output signal of the AND gate 232.

The transition indication signal that is the output of the edge sense circuit 210, the signal transmitted via the wiring 221, and a signal that is the voltage level of the signal transmitted via the wiring 222 inverted are inputted to the AND gate 234. A signal is then outputted as the output signal of the AND gate 234 in response to the transition indication signal that is the output of the edge sense circuit 210 when the voltage level of the signal transferred via the wiring 221 is an H level and the voltage level of the signal transferred by the wiring 222 is an L level. When the voltage levels of the signals transferred via the wiring 221 and 222 are otherwise, an L level voltage level signal is outputted as the output signal of the AND gate 234.

The control signal CN, a signal that is the voltage level of the signal transmitted via the wiring 221 inverted, and a signal that is the voltage level of the signal transmitted via the wiring 222 inverted are inputted to the AND gate 236. A signal is then outputted as the output signal of the AND gate 236 in response to the control signal CN when the voltage levels of the signals transferred via the wiring 221 and 222 are both L levels. When the voltage levels of the signals transferred at the wiring 221 and 222 are otherwise, a signal of an L level voltage level is outputted as the output signal of the AND gate 236.

The outputs of each of the AND gates 232, 234 and 236 are therefore controlled by signals transmitted via the wiring 221 and 222, i.e. one of the AND gates 232, 234 and 236 is selected using the information stored in the register 220.

For example, when a lower bit of the two bits of information within the register 220 is transmitted via the wiring 221 and an upper bit is transmitted via the wiring 222 and "11" is stored as the two bit data in the register 220, the register 220 outputs H level voltage level signals to both the wiring 221 and the wiring 222. In this case, the AND gate 232 is selected. Further, when "01" is stored as the two bit data in the register 220, the register 220 outputs an H level voltage level signal to the wiring 221 and outputs an L level voltage level signal to wiring 222 so that the AND gate 234 is selected. When "00" is stored as the two bit data in the register 220, the register 220 outputs L level voltage level signals to both the wiring 221 and the wiring 222 so that the AND gate 236 is selected. The OR gate 238 outputs a signal in response to any one signal selected for the AND gates 232, 234 and 236. For example, when the AND gate 232 is selected, the output of the OR gate 238 becomes a signal corresponding to the transition indication signal that is the output of the edge sense circuit 110. When the AND gate 236 is selected, the output of the OR gate 238 is a signal corresponding to the control signal CN.

The select circuit 230 outputs a signal in response to one of the transition indication signals that is the output of the edge sense circuit 110, the transition indication signal that is the output of the edge sense circuit 210, or the control signal CN based on the information stored in the register 220.

The counter 240 counts the number of clocks of the clock signal CK transferred via the switch circuit 280 when the switch circuit 280 is activated and outputs this counted count value. If, for example, the counter 240 is an eight bit counter, a count value from 0 to 255 is outputted and a count value of 0 is returned to upon overflow (when the count value corresponds to 256). In this embodiment, the counter 240 has the same function as the counter 120. One of the two counters 120 and 240 of FIG. 1 can therefore be adopted. This is described in detail hereafter. The clock signal CK is not transmitted to the counter 240 when the switch 280 is not activated and the count operation of the counter 240 is therefore inhibited.

The state of activation of the switch circuit 280 is controlled with the output signal of the select circuit 230. For example, the switch 230 goes. on when the voltage level of the output signal of the select circuit 230 is an H level and goes off when the voltage level of the output signal of the select circuit 230 is an L level. The output signal of the select circuit 230 therefore plays the role of a count permit signal for controlling the count operation of the counter 240.

The register 260 stores and outputs one of the count values obtained by the counter 240 as information. The information stored in the register 260 is described in the following.

The coincidence detection circuit 250 compares the count value outputted from the counter 240 and the prescribed count value being outputted that is stored in the register 260 and detects where these values coincide. A coincidence detection signal of a prescribed voltage level is then outputted when coincidence is detected in the two count values at the coincidence detection circuit 250. For example, the voltage level of the coincidence detection signal is an H level when coincidence is detected and is an L level when there is no coincidence detected.

The output circuit 270 is for outputting an output signal in order to perform external control (for example, to control peripheral circuits) in accordance with the coincidence detection signal outputted from the coincidence detection circuit 250 and is comprised of, for example, a single flip-flop. The output signal of the output circuit 270 outputs an H level output signal when a coincidence detection signal that the voltage level has made a transition from an L level to an H level is received and is reset a prescribed period of time afterwards (the voltage level of the output signal of the output circuit 270 is returned to an L level).

When a coincidence signal showing that the output signal of the output circuit 270 has made a transition from an H level to an L level voltage level or from an L level to an H level voltage level is received, the voltage level of the output signal can be made to make a transition by the peripheral circuits receiving the output signal of the output circuit 270. In this case, control is easier because it is not necessary to reset the output circuit 270.

The output timer 200 controls the count operation of the counter 240 using one of the transition indication signal outputted from the edge sense circuit 110 within the input timer 100, the transition indication signal outputted when a falling edge of the pulse signal PS is detected by the edge sense circuit 210, and a control signal CN for controlling output using software. When the count value of the counter 240 and a prescribed count value stored in the register 260 coincide, a voltage level designating detection of coincidence or an output signal with a voltage level that has made a transition is outputted from the output circuit 270. The output signal of the output timer 200 is transferred to other peripheral devices built-into the microcomputer.

For example, when the output timer 200 is built-into a microcomputer for use with a vehicle, the output signal of the output circuit 270 can be transferred to a circuit for controlling spark plug ignitions of an engine unit. If a count value corresponding to time intervals of igniting the spark plug is then pre-stored in the register 260, the plug can be made to ignite in prescribed intervals using the output signal of the output timer 200. Inhibiting of the count operation at the counter 240, i.e. having the switch circuit 280 off, is then, for example, for times where other processes have priority over the plug ignition process at the microcomputer.

The counting operation of the counter 240 of the output timer 200 is controlled by three signals, i.e. when a pulse signal PL and a pulse signal PS are inputted from two input ports at the microcomputer, the count permit signal that is the output of the select circuit 230 can be made to correspond to the transition indication signal that is the output of the edge sense circuit 210. When the pulse signal PL and the pulse signal PS are the same, the count permit signal that is the output of the select circuit 230 can be made to correspond to the transition indication signal that is the output of the edge sense circuit 110. Further, when the control signal CN for controlling the output using software is present, the count permit signal that is the output of the select circuit 230 can be made to correspond to the control signal CN. When the control signal CN is used, the switch circuit 280 can be controlled using a signal that does not pass through an edge sense circuit. The amount of time where the switch 280 is off can then be arbitrarily programmed.

In the microcomputer in this embodiment, the count operation occurring at the output timer 200 can be selectively controlled using three signals. The count operation of the output timer 200 can therefore be selectively controlled by signals generated by external peripheral circuits of the microcomputer or internally and the method of controlling operation of the timer functions can therefore be arbitrarily selected in response to user requests or the functions of the peripheral circuits so as to provide a microcomputer that can be put to a wide variety of uses.

With the microcomputer in this embodiment, the count operation of the output timer 200 is controlled by the register 220 and the select circuit 230. The amount of circuitry that needs to be added to bring about this control and the extent of the complexity of the control can therefore be dramatically reduced.

It is also possible to change the information stored in the register 220 and the prescribed count value stored in the register 260 in this embodiment.

For example, when the pulse signal PL and the pulse signal PS are inputted from two input ports so that it is possible to selectively control the count operation occurring at the output timer 200 in response to the transition indication signal that is the output of the edge sense circuit 110 or the edge sense circuit 210, the information stored in the register 220 can be changed in response to a signal indicating which of the edge transition indication signals is to be used for controlling the count operation of the output timer 200. It is also possible to change information stored in the register 220 in response to a signal indicating which of the three signals is to be used for controlling the count operation of the output timer 200 even when the signal CN is outputted.

When, for example, the interval between spark plug ignitions is to be speeded up in accompaniment with the speed of a piston operation of a cylinder of an engine unit, the count value stored in the register 260 can be changed each time in response to a signal outputted in accompaniment with this request.

In the above embodiment, two timers that have two counters 120 and 240 having the same functions are provided but a counter can be used in common when the pulse signal PL and the pulse signal PS are the same signal depending on the peripheral circuits using the tinier output signals. The two edge sense circuits and the two switch circuits can also be used in common. When the activated state of a single shared switch 30 circuit is put under the control of the output from the select circuit 230, it is preferable for the count value of a single shared counter to be stored in the register 140 via the gate circuit 130 in response to a transition indication signal of a shared single edge sense circuit. Further, the count value of the single counter used in common can be transferred to the coincidence detection circuit 250 and compared with a prescribed count value stored in the register 260 at the coincidence detection circuit 250. The signal selected at the select circuit 230 is taken as one of the transition indication signals from the common edge sense circuit, the control circuit CM and the control signal CN.

As common circuit configurations can be shared by the two timers in this way, the circuit configurations for the timer portion and the surface area taken up can both be reduced and reductions in integration and costs are anticipated. The count value transferred to the coincidence detection circuit 250 can also be received by a gate circuit 130 in parallel with the coincidence detection circuit 250 without coming from the register 140. In this case, high speeds can be expected for the operation speeds for the timer functions.

In the first embodiment, the input timer and the output timer can be independently controlled when an edge sense circuit, switch circuit and counter are respectively provided for the input timer 100 and the output timer 200. This provides the benefits when compared with shared use that control is straightforward and application to peripheral circuits is simple.

Figure 2:
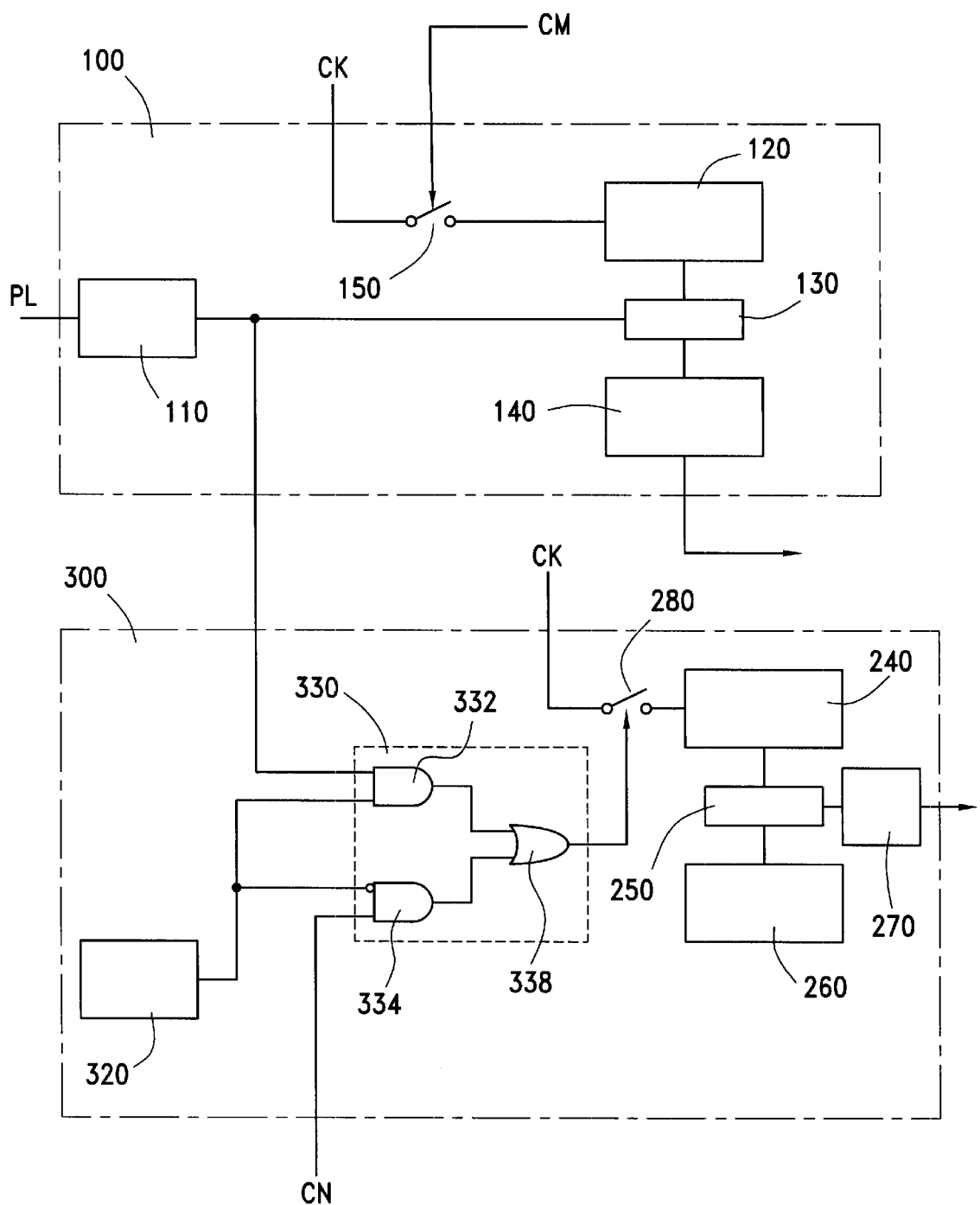
FIG. 2 is a block diagram of a timer circuit provided at a microcomputer of a second embodiment of the present invention.

Next, a description is given using the drawings of a microcomputer of a second embodiment of the present invention. FIG. 2 is a block diagram of a timer circuit provided at a microcomputer of the second embodiment of the present invention. Elements of the configuration in FIG. 2 that are the same as elements of FIG. 1 are given the same numerals.

In FIG. 2, structural components corresponding to the edge sense circuits are eliminated from an output timer 300. The functions of a register 320 and a select circuit 330 are also modified as a result of the edge sense circuit being eliminated. The input timer 100 and the structural components thereof of FIG. 2 and other aspects of the structural components of the output timer 300 are the same as for the case in FIG. 1.

The select circuit 330 comprises two two input/one output AND gates 332 and 334, and one two input/one output OR gate 338.

A transition indication signal that is the output of the edge sense circuit 110 and an output signal from the register 320 are inputted to the AND gate 332. A signal is then outputted as the output signal of the AND gate 332 in response to the transition indication signal that is the output of the edge sense circuit 110 when the voltage level of the output signal of the register 320 is an H level. An L level voltage signal is then outputted as the output signal for the AND gate 332 when the voltage level of the output signal of the register 320 is an L level.

The control signal CN for output control using software and a signal that is the voltage level of the output signal from the register 320 inverted are inputted to the AND gate 334. A signal is then outputted as the output signal of the AND gate 334 in response to the control signal CN when the voltage level of the output signal of the register 320 is an L level. A signal of an L level voltage is then outputted as the output signal for the AND gate 334 when the voltage level of the output signal of the register 320 is an H level.

The output of each of the AND gates 332 and 334 is controlled by the output signal of the register 320, i.e. one of the AND gates 332 and 334 is selected using the information stored in the register 320. For example, when "1" is stored as one bit of data in the register 320 the register 320 outputs an output signal of an H level voltage and in this case, the AND gate 332 is selected. When "0" is stored in the register 320 as one bit of data the register 320 outputs an output signal of an L level voltage so that the AND gate 334 is selected.

The OR gate 338 outputs a signal in response to the signal of the one of the AND gates 332 and 334 that is selected. For example, when the AND gate 332 is selected, the output of the OR gate 338 is a signal corresponding to the transition indication signal that is the output of the edge sense circuit 110. When the AND gate 334 is selected, the output of the OR gate 338 is taken as a signal corresponding to the control signal CN.

The select circuit 330 is capable of outputting a signal in response to one of the transition indication signal that is the output of the edge sense circuit 110 and the control signal CN based on information stored in the register 320.

The register 320 stores information indicating which of the two signals to be inputted to the select circuit 330 is to be selected and outputs a signal in response to this information. The information stored in the register 320 is a "0" or a "1" as described above. The register 320 in this embodiment can be constructed from, for example, a single flip-flop because a one bit portion of information is stored.

The input timer 100 and the output timer 300 of the second embodiment described above are built into a microcomputer in such a manner that the pulse signal PL is inputted from an input port but the pulse signal PS is not inputted. The circuit structure for the register 320 and the select circuit 330 can therefore be simplified compared to the register 220 and the select circuit 230 of the first embodiment and control is easier because the structure for the pulse signal PS of the first embodiment is no longer necessary. A high speed operation can therefore be achieved due to easier integration and control for the whole of the microcomputer with the configuration of the second embodiment when it is known beforehand that the pulse signal PS is not going to be inputted.

It is also possible in the second embodiment to change the information stored in the register 320 and the prescribed count value stored in the register 260. Structural components that are common to the input timer 100 and the output timer 300 can also be shared.

Figure 3:
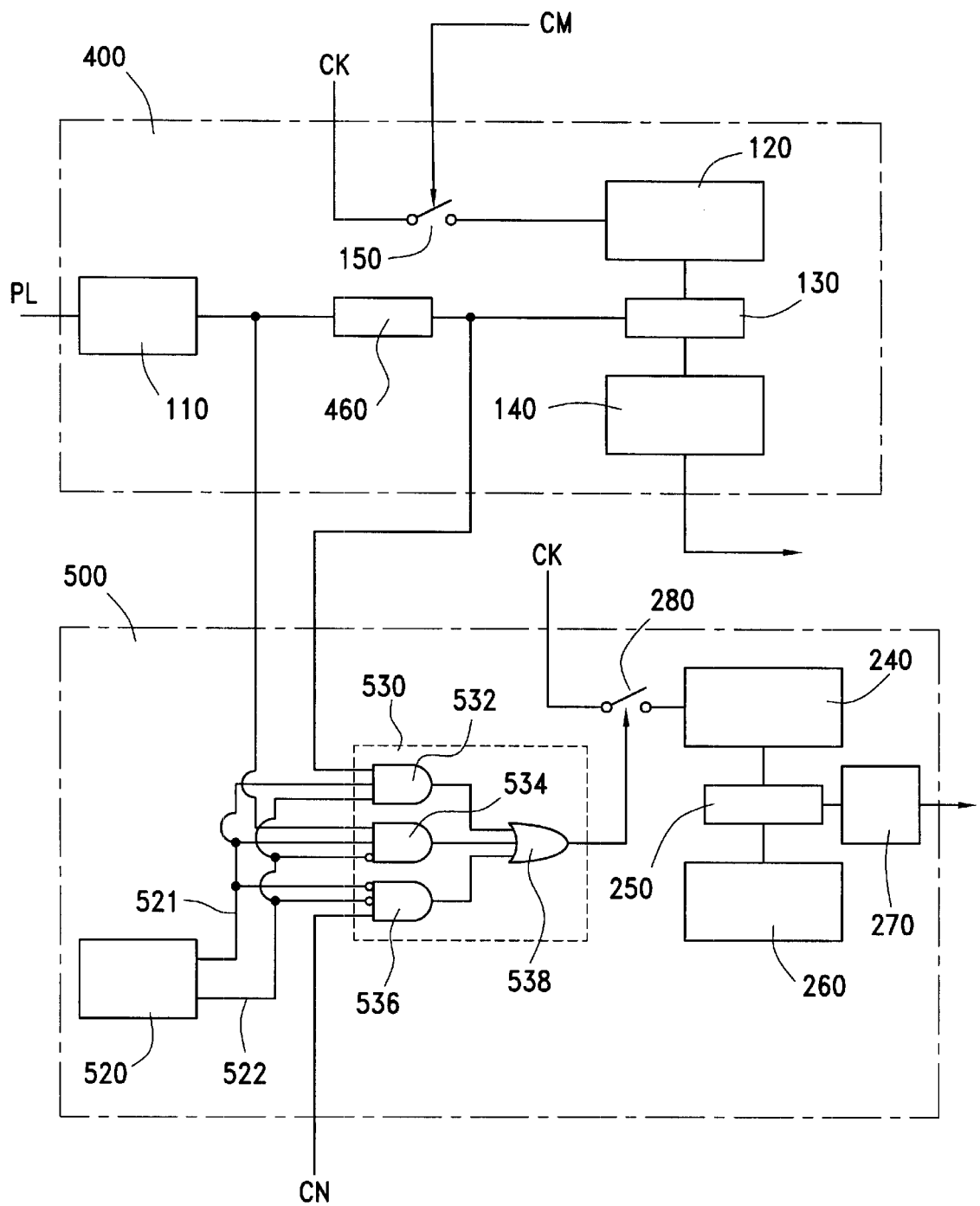
FIG. 3 is a lock diagram of a timer circuit provided at a microcomputer of a third embodiment of the present invention.

Next, a microcomputer of a third embodiment of the present invention is described using the drawings. FIG. 3 is a block diagram of a timer circuit built-into a microcomputer of the third embodiment of the present invention. In FIG. 3, structural components that are the same as for FIG. 1 are given the same numerals.

In FIG. 3, a dividing circuit 460 is added at an input timer 400 and structural components corresponding to the edge sense circuit are eliminated at an output timer 500. A signal selection process using a register 520 and a select circuit 530 is changed in accompaniment with eliminating the edge sense circuit. The input timer 400 and other structural components thereof and the output timer 500 and other structural components thereof are the same as for the case of FIG. 1.

The dividing circuit 460 is for dividing and outputting a transition indication signal outputted by the edge sense circuit 110. For example, if the dividing circuit 460 is to divide by ½, even if the transition indication signal is generated as a one-shot pulse, the pulse width can be doubled. The extent to which the dividing circuit 460 carries out division can be changeable or fixed. Control is straightforward and the circuit structure is simple when the extent of the dividing is fixed. When the extent of dividing is made variable, the extent of dividing and be set in an arbitrary manner and the scope for application to the peripheral circuits is broadened.

The dividing circuit 460 is provided so that the gate circuit 130 operates in a stable manner and the count value of the counter 120 is reliably stored in the register 140 even when the intervals between inputting of the pulse signal PL become short.

The select circuit 530 comprises three three input/one output AND gates 532, 534 and 536, and one three input/one output OR gate 538.

An output signal from the dividing circuit 460 and signals transmitted via wiring 521 and 522 are inputted to the AND gate 532. A signal is therefore outputted as the output signal of the AND gate 532 in response to the output signal of the dividing circuit 460 when the voltage levels of signals transmitted via the wiring 521 and 522 are both H. When the voltage levels of the signals transmitted via the wiring 521 and 522 are otherwise, an L voltage level signal is outputted as the output signal of the AND gate 532.

The transition indication signal that is the output of the edge sense circuit 110, the signal transmitted via the wiring 521 and a signal that is the voltage level of the signal transmitted at the wiring 522 inverted are inputted to the AND gate 534. When the voltage level of the signal transmitted via the wiring 521 is an H level, and the voltage level of the signal transferred via the wiring 522 is an L level, a signal is outputted as the output signal of the AND gate 534 in response to the transition indication signal that is the output of the edge sense circuit 110. When the voltage levels of the signals transferred via the wiring 521 and 522 are otherwise, an L voltage level signal is outputted as the output signal for the AND gate 534.

The control signal CN, a signal that is the voltage level of the signal transmitted via the wiring 521 inverted, and a signal that is the voltage level of the signal transmitted by the wiring 522 inverted are inputted to the AND gate 536. A signal is therefore outputted as the output signal of the AND gate 536 in response to the control signal CN when the voltage levels of the signals transmitted via the wiring 521 and 522 are both L levels. When the voltage levels of the signals transmitted via the wiring 521 and 522 are otherwise, a signal of an L voltage level is outputted as the output signal for the AND gate 536.

The outputs of each of the AND gates 532, 534 and 536 are controlled by the signals transmitted via the wiring 521 and the wiring 522, i.e. one of the AND gates 532, 534 and 536 is selected using the information stored in the register 520.

For example, if the information corresponding to the wiring 521 is taken as the lower bit and the information corresponding to the wiring 522 is taken as the upper bit, when "11" is stored as the two bits of data in the register 520, the register 520 outputs H level voltage signals to both the wiring 521 and the wiring 522 so that the AND gate 532 is selected. When "01" is stored as the two bits of data in the register 520, the register 520 outputs an H level voltage signal to the wiring 521 and an L level voltage signal to the wiring 522 so that the AND gate 534 is selected. Further, when "00" is stored as the two bits of data in the register 520, the register 520 outputs an L level voltage signal to both the wiring 521 and the wiring 522 so that the AND gate 536 is selected.

The OR gate 538 is for outputting a signal in response to the one signal for whichever one of the AND gates 532, 534 and 536 is selected. For example, when the AND gate 532 is selected, the output of the OR gate 538 is taken to be a signal in accordance with the output signal of the dividing circuit 460. When the AND gate 534 is selected, the output of the OR gate 538 becomes a signal corresponding to the transition indication signal that is the output of the edge sense circuit 110. When the AND gate 536 is selected, the output of the OR gate 538 becomes a signal corresponding to the control signal CN.

The select circuit 530 is capable of outputting a signal corresponding to one of the transition indication signal that is the output of the edge sense circuit 110, the output signal of the dividing circuit 460 and the control signal CN based on the information stored in the register 520.

The register 520 is for storing information indicating which of the three signals inputted to the select circuit 530 is to be selected and outputting signals to the wiring 521 and 522 in accordance with this information. As described above, this stored information can be any one of "11", "01" or "00". The register 520 of this embodiment can be constructed from, for example, two flip-flops in order to store a two-bit portion of information.

With the microcomputer of the third embodiment of the above configuration, it is possible to select and output signals for the dividing circuit 460 using a signal selected by the select circuit 530. Various applications are therefore possible with the microcomputer of this third embodiment, with signals being selected at the select circuits of each practical example as necessary. If the number of signals taken as targets for selection at the select circuit is then increased, application to peripheral circuits can be broadened.

It is also possible to change the information stored in the register 520 and the prescribed count values stored in the register 260 in the third embodiment. It is also possible for the input timer 400 and the output timer 500 to share common structural components.

Various embodiments are described above but the configuration of the present invention is by no means limited to the above embodiments.

For example, the switch circuits 150 and 280 can be made from a single resistor. According to the operation of each of the above embodiments, the switch circuits 150 and 280 are inputted with the clock signal CK at one input terminal and are inputted with the control signal CM at the other input terminal or an AND gate may input a count permit signal outputted from the select circuit. Further, each of the select circuits may take on other configurations providing the functions in each of the above embodiments are achieved.

In each of the above embodiments, at the output timer the count permit signal that is the output signal of the select circuit directly controls the activated state of the switch circuit 280, but the present invention is by no means limited in this respect.

For example, a latch circuit comprised of R-S flip-flops can also be used. This latch circuit can, for example, consist of two two input/one output NOR gates. One input of a first NOT gate is then used as a data terminal of a flip-flop and the other input terminal is connected to an output terminal of a second NOR gate. One input terminal of the second NOR gate is then used as a reset terminal of the flip-flop and the other input terminal is connected to the output terminal of the first NOR gate. The output terminal of the second NOR gate is used as an output terminal for the flip-flop.

A count permit signal that is the output signal of the select circuit is then inputted to the data terminal on the input side of the latch circuit. A reset signal outputted so as to correspond to control conditions of peripheral circuits based on the output signal of the output timer is then inputted to the reset terminal on the input side. The activated state of the switch circuit 280 can then be controlled with the signal outputted from the output terminal of the latch circuit.

In this case, first, the voltage level of the output signal of the latch circuit is put to an L level by inputting L level voltage signals to the data terminal and reset terminal of the latch circuit as an initial state. When the voltage level of the count permit signal that is the output signal from the select circuit makes a transition from an L level to an H level, the voltage level of the output signal of the latch circuit can be made to go from an L level to an H level. The voltage level of the output signal of the latch circuit can therefore be kept at an H level even if the voltage level of the signal inputted from the data terminal returns to an L level thereafter. The voltage level of the output signal of the latch circuit is then returned to an L level when the voltage level of a reset signal becomes an H level. It is therefore possible to maintain the time for which the switch circuit 280, the activated state of which is controlled by the output signal of the latch circuit, is in an activated state for the desired period of time.

In each of the above embodiments, data "10" that is not stored in the register 220 and the register 520 can be used and this data "10" can be stored as information for inhibiting the select operation using the select circuit. In this case, the state of the switch circuit 280 can be fixed.

In each of the embodiments, the switch circuits 150 and 280 are turned on by H level voltage signals but the present invention is by no means limited in this respect and the switch circuits 150 and 280 can also be turned on by L level signals or signals of different voltage levels can be used to control the activated states of the switch circuit 150 and the switch circuit 280 respectively. With these settings, the switch circuits can be controlled with optimum voltage levels in response to the conditions of use etc. of the input timer and the output timer.

The present invention is by no means limited to the above embodiments and various modifications are possible.

What is claimed is:

1. A microcomputer comprising:
    a first timer circuit for counting pulses of a clock signal and outputting a first count value based on a transition indication signal indicating a transition of a voltage level of an externally inputted pulse signal;
    a second timer circuit, operating in response to a count permit signal, for counting pulses of the clock signal to generate a second count value and outputting an output signal when the second count value reaches a prescribed count value; and
    a select circuit for outputting one of a plurality of signals, including the transition indication signal and an internally generated signal, as the count permit signal for controlling the counting of pulses of the clock signal by the second timer circuit.

2. The microcomputer of claim 1, wherein generation of the internally generated signal is controlled by software.

3. The microcomputer of claim 2, wherein the select circuit outputs one of the plurality of signals as the count permit signal in response to a select indication signal.

4. The microcomputer of claim 3, wherein the plurality of signals additionally includes an externally inputted control signal.

5. The microcomputer of claim 2, wherein the plurality of signals additionally includes an externally inputted control signal.

6. The microcomputer of claim 2, wherein the first timer circuit comprises a dividing circuit for outputting a divided signal divided from the transition indication signal, wherein the first timer circuit outputs the first count value in response to the divided signal, and wherein the divided signal is included in the plurality of signals selected by the select circuit.

7. The microcomputer of claim 1, wherein the select circuit outputs one of the plurality of signals as the count permit signal in response to a select indication signal.

8. The microcomputer of claim 7, wherein the plurality of signals additionally includes an externally inputted control signal.

9. The microcomputer of claim 7, wherein the first timer circuit comprises a dividing circuit for outputting a divided signal divided from the transition indication signal, wherein the first timer circuit outputs the first count value in response to the divided signal, and wherein the divided signal is included in the plurality of signals selected by the select circuit.

10. The microcomputer of claim 1, wherein the plurality of signals additionally includes an externally inputted control signal.

11. The microcomputer of claim 10, wherein the first timer circuit comprises a dividing circuit for outputting a divided signal divided from the transition indication signal, wherein the first timer circuit outputs the first count value in response to the divided signal, and wherein the divided signal is included in the plurality of signals selected by the select circuit.

12. The microcomputer of claim 1, wherein the first timer circuit comprises a dividing circuit for outputting a divided signal divided from the transition indication signal, wherein the first timer circuit outputs the first count value in response to the divided signal, and wherein the divided signal is included in the plurality of signals selected by the select circuit.

13. The microcomputer of claim 5, wherein the first timer circuit comprises a dividing circuit for outputting a divided signal divided from the transition indication signal, wherein the first timer circuit outputs the first count value in response to the divided signal, and wherein the divided signal is included in the plurality of signals selected by the select circuit.

* * * * *